Sept. 22, 1964     M. D. VAN PEURSEM     3,149,610
MATERIAL DISTRIBUTOR AND ANIMAL STOCK FEEDER
Filed Oct. 12, 1962
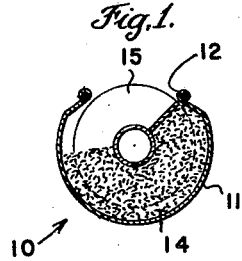
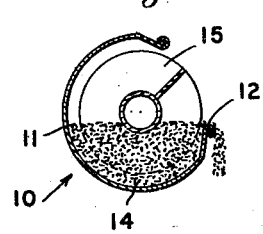
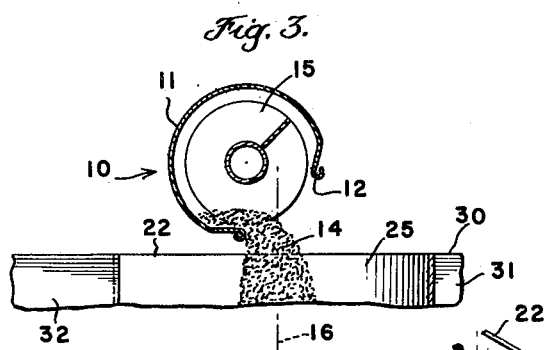
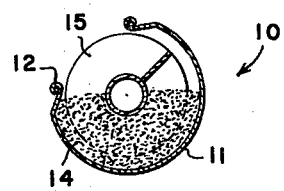
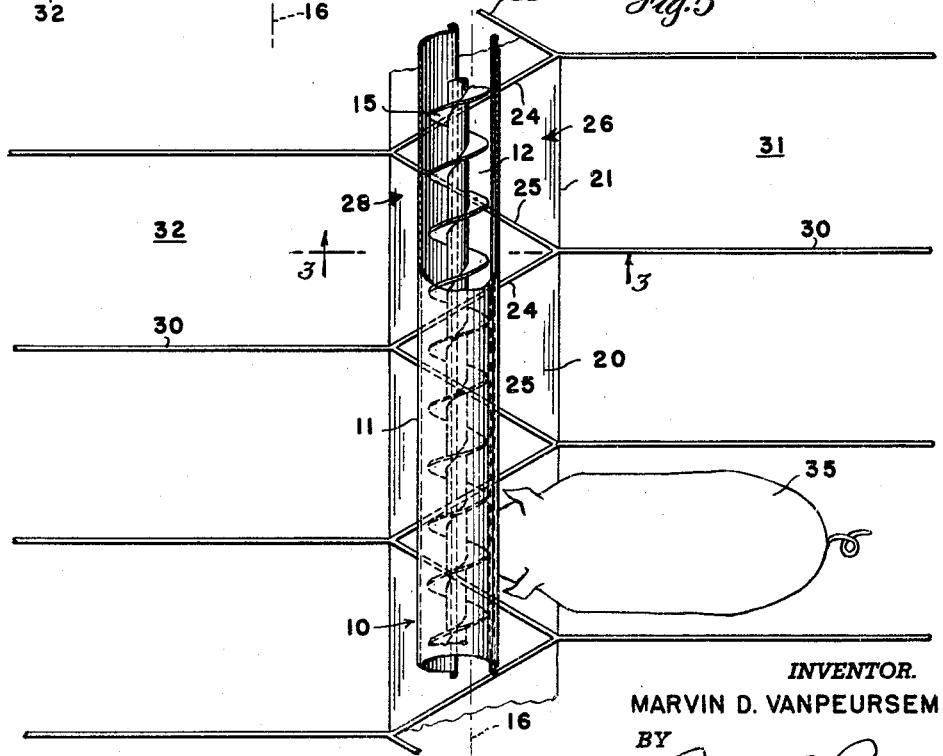
INVENTOR.
MARVIN D. VANPEURSEM
BY Joseph A. Brown
ATTORNEY

3,149,610
MATERIAL DISTRIBUTOR AND ANIMAL STOCK FEEDER

Marvin D. Van Peursem, New Holland, Pa., assignor to Sperry Rand Corporation, New Holland, Pa., a corporation of Delaware
Filed Oct. 12, 1962, Ser. No. 230,101
1 Claim. (Cl. 119—51)

This invention relates to apparatus for handling forage and other feeds. More particularly, the invention relates to a material distributor and stall arrangement for feeding stock animals.

In recent years, multiple limited feeding has gained in popularity. By such a feeding system, stock animals are fed at frequent intervals but with less feed per feeding and less total feed. The animals are maintained at a moderately hungry state and the feed supplied at any given feeding does not fully satisfy such hunger. Thus, the animals are kept in a condition wherein they consume all of the feed made available to them, with no wastage. Further, it has been found that animals on multiple limited feeding have a greater weight gain with less feed. Thus, the cost of a pound of meat produced is less than when conventional feeding practices are employed.

Multiple limited feeding has produced very good results with hogs. However, since the animals are maintained in a hungry state, there is a tendency for them to fight with each other for feed when it is delivered. This is particularly true with sows. It is necessary, therefore, to provide a feeding arrangement for hogs which will prevent disturbance during a feeding time.

One object of this invention is to provide a feed distributor and stall arrangement particularly adapted for multiple limited feeding.

Another object of this invention is to provide a feed distributor and stall arrangement whereby all of the animals receive equal portions of the feed delivered at any given feeding time.

Another object of this invention is to provide a feed distributor and stall arrangement whereby the animals are segregated from each other thereby eliminating fighting and other disturbance during feeding.

A still further object of this invention is to provide a stall arrangement wherein certain walls of the stalls serve to divide a feed trough into separate feeding stations and such walls being common to more than one stall thereby minimizing the structural materials required.

Other objects of this invention will be apparent hereinafter from the specification and from the recital in the appended claim.

In the drawing:

FIG. 1 is a generally diagrammatic vertical section through a feed distributor of the fill and dump type and showing the structure in a fill position;

FIG. 2 is a view similar to FIG. 1 but showing the distributor beginning to dump feed;

FIG. 3 is a fragmentary section taken on the line 3—3 of FIG. 5 looking in the direction of the arrows and showing the feed distributor in a dump position;

FIG. 4 shows the distributor returning towards starting position to be again filled with feed; and FIG. 5 is a diagrammatic plan view showing the distributor mounted for cooperation with a particular stall arrangement so that feed delivered by the feeder will be equally distributed among a plurality of stalls.

Referring now to the drawing by numerals of reference, 10 denotes a feed distributor which may be constructed and similar to the device disclosed in U.S. Patent No. 2,940,639 and especially suited to handling feeds for stock animals. The distributor comprises an elongated container 11 which is adapted to be rotatably mounted and extending horizontally relative to the ground. Container 11 is generally U-shaped in cross section, having a longitudinal slot 12 which extends the length of the container. Slot 12 is adapted to be located in a twelve o'clock position as shown in FIG. 1 so that feed 14 may be distributed through the length of the container. Conventionally, an auger 15 is provided which is rotatable within container 11 and adapted to withdraw material from a supply hopper, not shown, and to distribute such material throughout the length of the container. When container 11 has been provided with feed throughout its length, it is adapted to be rotated in a clockwise direction to move slot 12 from an upper fill position to a lower dump position as shown in FIG. 3. As the slot 12 travels toward and past a six o'clock location, the feed in container 11 is dumped. The feed begins to be discharged at approximately a three o'clock location as shown in FIG. 2 with the major portion of the feed discharged by the time the six o'clock position is reached. The ribbon of material which is discharged falls in a vertical plane substantially along the center line 16 of the troughs 20 as indicated in FIGS. 3 and 5 and laterally offset from a vertical plane through the longitudinal axis of container 11 and auger 15.

In FIG. 5, container 11 is shown in plan and substantially in the rotatable position indicated by FIG. 3. The feed which is discharged from container 11 is deposited in a feed trough 20 beneath the container. The trough has side walls 21 extending parallel to the distributor and spaced relative to each other. Each trough wall is approximately the same distance from the line of deposit at 16 of the feed 14.

Extending upwardly from trough 20 is a partition 22 which is of zigzag configuration, having wall portions 24 which extend diagonally across line 16 from one side to the other side of the line, and wall portions 25 which extend from the other side of the line to the one side. Wall portions 24 and 25 form a first row of feeding stations 26 along one side of the partition 22 and a second row of feeding stations 28 along the opposite side of the partition. All of the feeding stations are triangularly shaped and of equal size. Further, each feeding station projects the same distance beneath the feed distributor 10 and beyond the center line 16 for the deposit of feed. Thus, when feed is dumped from the distributor 10 all of the feeding stations receive substantially the same proportion of feed.

To prevent disturbances during feeding, each feeding station is provided with pen or stall partition walls 30 which extend perpendicular to trough 20 and feed distributor 10. These walls form a first row of stalls 31 for the feed stations 26 and a second row of stalls 32 for the feed stations 28. As shown in FIG. 5, the stalls are on opposite sides respectively of the trough 20, the stalls in one row being staggered relative to the stalls in the other row to provide maximum animal room in a minimum amount of space.

An animal 35 standing in one of the walls is prevented from disturbing animals in adjacent stalls. The triangular feeding station in front of the animal provides that portion of the trough from which the animal is to feed. Since all feeding stations are of the same size and receive substantially the same proportion of feed, each animal receives a fair share, and no disturbance among the animals results.

As shown, the various walls which form the stalls and feeding stations are common to the feeding stalls for several animals. Structural elements are kept to a minimum, yet the segregation of the animals from each other and from the feed provided for each animal is maintained at a maximum.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claim.

Having thus described my invention, what I claim is:

A stock feeding arrangement comprising, in combination, a rectilinear feed trough having parallel sides, a mechanical feed distributor located vertically spaced above said feed trough and extending parallel thereto, said distributor having a container formed with a rectilinear slot extending lengthwise, an auger within said container for conveying and distributing feed throughout the length of the container, said auger having an axis located offset relative to the center of said trough and toward one of said trough sides, said container being rotatable about its longitudinal axis in a direction toward the other side of said trough to move said slot from an upper to a lower position to dump feed downwardly from the container in a substantially continuous ribbon of feed, the major portion of said feed being dumped into the center of said trough along a given line parallel to the trough, a zigzag partition beneath said distributor and extending upwardly from said trough, said partition having adjoining wall sections which alternately cross over from one side of said line to the other and then from said other side to said one side to form a first row of triangularly shaped trough sections along one side of said partition and a second row of triangularly shaped trough sections along the other side of said partition, all of said trough sections being of substantially the same size and each having an apex located along a trough side, said wall sections being so related to said given line that said ribbon of feed is deposited in substantially equal proportions on each side of said partition, a plurality of walls along one side of said trough and extending perpendicular thereto to form one stall for each trough section of said first row, and a plurality of walls along the other side of said trough and extending perpendicular thereto to form one stall for each trough section of said second row, said walls extending from the apex of each triangle where one wall section adjoins another, and the walls along one side of the trough being offset relative to the walls along the opposite side.

References Cited in the file of this patent

UNITED STATES PATENTS

| | | |
|---|---|---|
| 111,122 | Hovenden | Jan. 24, 1871 |
| 716,952 | Snow | Dec. 30, 1902 |
| 2,505,396 | Grindstaff | Apr. 25, 1950 |
| 2,580,106 | Lattimer | Dec. 25, 1951 |
| 2,940,639 | Winter | June 14, 1960 |
| 3,031,064 | Kline | Apr. 24, 1962 |
| 3,037,611 | Majorowicz | June 5, 1962 |